United States Patent
Nuzzi

(12) 
(10) Patent No.: US 10,673,620 B2
(45) Date of Patent: Jun. 2, 2020

(54) BLOCKCHAIN VALIDATION SYSTEM

(71) Applicant: PAYPAL, INC., San Jose, CA (US)

(72) Inventor: Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 235 days.

(21) Appl. No.: 15/841,712

(22) Filed: Dec. 14, 2017

(65) Prior Publication Data

US 2019/0190698 A1 Jun. 20, 2019

(51) Int. Cl.
| | |
|---|---|
| *H04L 12/28* | (2006.01) |
| *H04L 9/06* | (2006.01) |
| *H04L 9/32* | (2006.01) |
| *G06F 16/51* | (2019.01) |
| *G06F 16/58* | (2019.01) |
| *G06F 16/50* | (2019.01) |
| *G06K 9/20* | (2006.01) |

(52) U.S. Cl.
CPC ............ *H04L 9/0643* (2013.01); *G06F 16/50* (2019.01); *G06F 16/51* (2019.01); *G06F 16/58* (2019.01); *G06K 9/20* (2013.01); *H04L 9/3236* (2013.01); *H04L 9/3239* (2013.01); *H04L 9/3247* (2013.01); *H04L 9/3297* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 10,013,246 | B2* | 7/2018 | Zessin | G06F 8/65 |
| 2007/0154106 | A1* | 7/2007 | Koziarz | H04N 1/4105 |
| | | | | 382/244 |
| 2008/0215606 | A1* | 9/2008 | Baron | H03M 7/3084 |
| 2012/0311342 | A1* | 12/2012 | Nuzzi | G06F 21/31 |
| | | | | 713/182 |
| 2016/0283920 | A1 | 9/2016 | Fisher et al. | |
| 2017/0046526 | A1 | 2/2017 | Chan et al. | |
| 2017/0250815 | A1 | 8/2017 | Cuende et al. | |
| 2017/0257358 | A1* | 9/2017 | Ebrahimi | H04L 9/3247 |
| 2018/0109541 | A1* | 4/2018 | Gleichauf | H04L 63/123 |
| 2018/0349207 | A1* | 12/2018 | Erickson | G06F 17/24 |
| 2019/0050856 | A1* | 2/2019 | Vintila | G06Q 20/3829 |
| 2019/0066079 | A1* | 2/2019 | Liu | G06Q 20/0453 |
| 2019/0066119 | A1* | 2/2019 | Sengupta | G06Q 20/4016 |
| 2019/0180275 | A1* | 6/2019 | Safak | G06Q 20/3825 |

OTHER PUBLICATIONS https://blockexplorer.com; 4 pages.

* cited by examiner

*Primary Examiner* — Elisabeth Benoit Magloire
(74) *Attorney, Agent, or Firm* — Haynes and Boone, LLP

(57) ABSTRACT

Blockchain validation is provided by receiving a first validation request of a blockchain. A hashing algorithm is applied to a first block of the blockchain to generate a first hash value. In response to the first validation request of the blockchain, a first image from a plurality of images is provided on a display device. The first image is selected to be provided for display on the display device based on the first hash value. The first image may be compared to a second image that was provided for display on the display device prior to the first validation request and that image was provided based on a second hash value to determine whether the first image and the second image are substantially similar, which indicates that no changes have been made to the data in the blockchain.

20 Claims, 12 Drawing Sheets

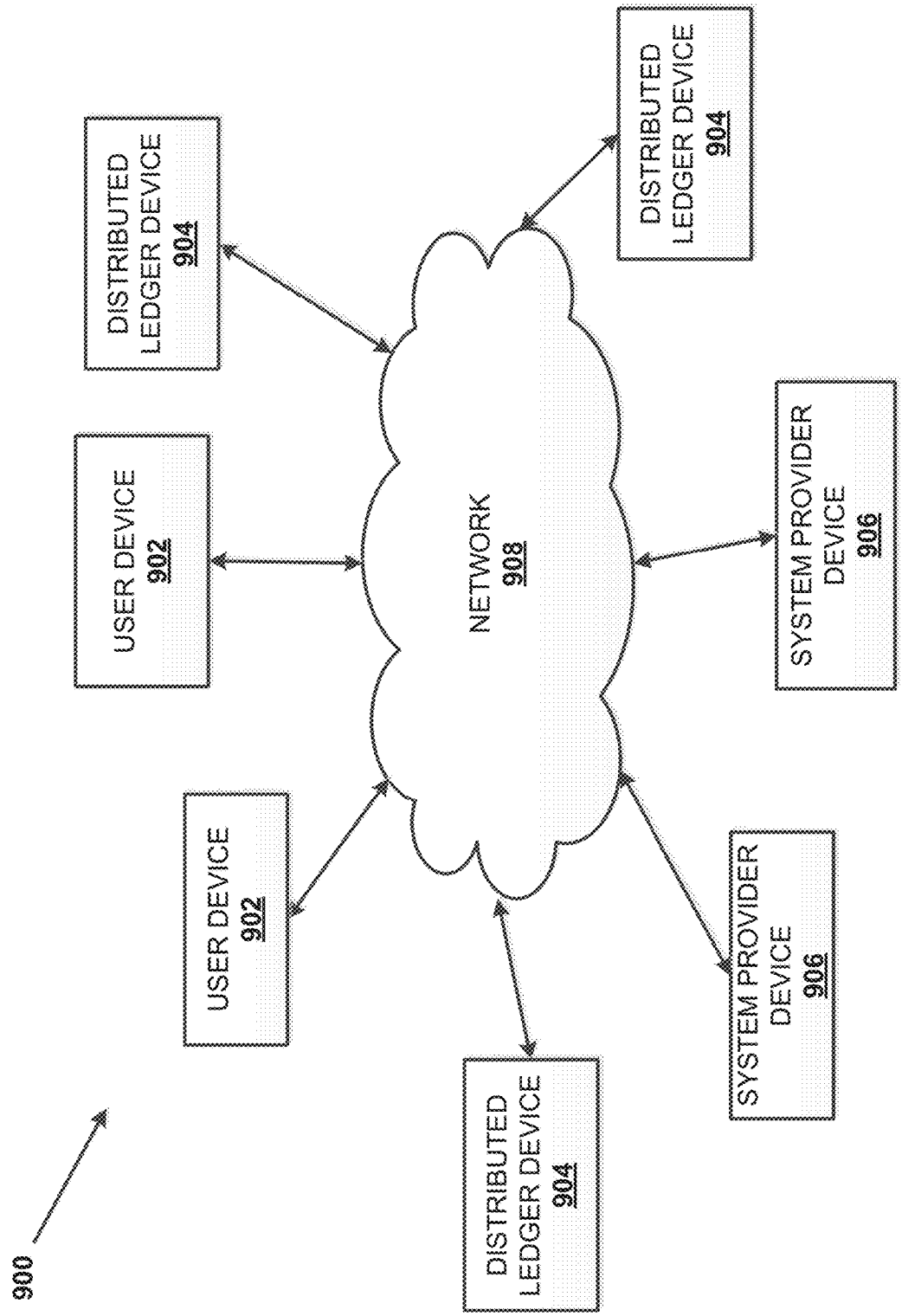

BLOCKCHAIN VALIDATION SYSTEM

BACKGROUND

The present disclosure generally relates to a blockchain system and more particularly to a system for validating the authenticity of a blockchain.

Blockchains are sometimes used for transactions involving crypto or virtual currencies, such as Bitcoin. Virtual currency systems may provide unregulated, digital money that may be issued and controlled by distributed software created by the virtual currency developer of that virtual currency, rather than by central banks or public authorities that conventionally issue and control fiat currencies. For example, Bitcoin is a type of decentralized virtual currency that provides for peer-to-peer transactions without an intermediary, with those peer-to-peer transactions verified by Bitcoin network nodes and recorded in a public distributed ledger called a blockchain. Virtual currencies like Bitcoin have revolutionized money transfer and payment technology by allowing for inexpensive peer-to-peer transfer of value between users.

Blockchains may also be used for a number of different other technologies besides virtual currency. One aspect common to many blockchains, however, is the way that consensus and validation operations work to provide reliable verification for transactions occurring on the blockchain. Thus, an inconsistency between different nodes that implement a blockchain can indicate that an issue with the blockchain is occurring.

BRIEF DESCRIPTION OF THE FIGURES

FIG. 9 is a schematic view illustrating an embodiment of a networked system;

Figure 1:
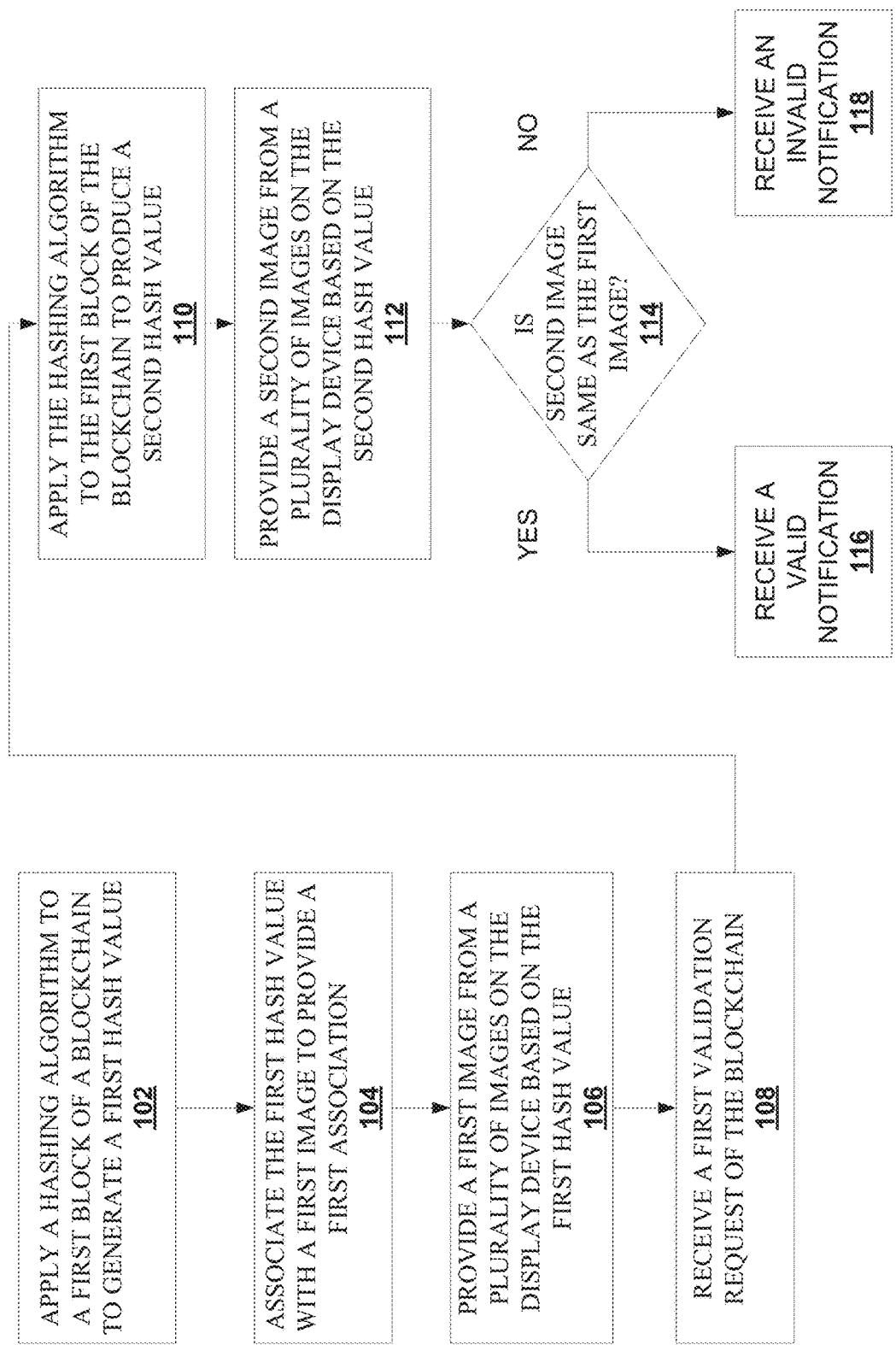
FIG. 1 is a flow chart illustrating an embodiment of a method for validating a blockchain.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods for providing a blockchain validation system using image verification. A key aspect for virtual currency use of blockchain and similarly for other blockchain uses is validating the blockchain and recording the virtual currency transactions. In one method, each block of a blockchain includes a hash value as a signature of the currently stored data and a link to previously stored data in a previous block. When validating a blockchain, some users visually validate the hash value by running a script that generates the hash value and comparing the resulting hash value to other hash values generated by the distributed blockchain to determine whether any changes have been made to the blockchain. While comparing hash values to validate the blockchain may be easy for someone that is technically knowledgeable in the area of blockchains, validating blockchain by comparing hash values may not be as user friendly in areas where blockchain is used for personal use cases or by general consumers.

Furthermore, comparing a hash value to other hash values may be time consuming as it is difficult to memorize a known hash value in order to validate it. The systems and methods of the present disclosure provide for a more user-friendly blockchain validation system by eliminating the need for a user to memorize a lengthy hash value when validating a blockchain.

As discussed below, the systems and methods of the present disclosure associate an image with the hash value for a particular block in the blockchain when that block is created. Thus, when a user accesses the blockchain to validate the blockchain, that image is visually presented on a display device of that user if the underlying blockchain data has not changed. However, if the data within the blockchain has been modified, then the image presented on the display device will change because the hash value has changed. Therefore, a user of the blockchain may easily remember the image that was associated with the hash value when that user created the block and subsequently validate the blockchain when that image is reproduced or invalidate the blockchain when that image is not reproduced such as when an unexpected image is reproduced.

In various examples, images may be stored in the blockchain or otherwise be included in a service provider database. A converter may convert the hash value to an image identifier or otherwise associate the hash value with one of the images. In an example, there may be only one plenoptic image associated with the blockchain that includes a plurality of objects that are each assigned a focal point. When that focal point is selected and the plenoptic image is displayed on the display device, the object assigned to that focal point may be in focus while the other objects in the plenoptic image are out of focus. Associating the hash value with a focal point of a plenoptic image rather than separate images greatly reduces the amount of memory and system resources that are required to provide the blockchain validation system disclosed within, because the same plenoptic image may be associated with a plurality of hash values. Therefore, it is possible to store the plenoptic image in the blockchain, which may have a limited data size.

Referring now to FIGS. 1, 2, 3, 4 and 5 a method 100 for providing blockchain validation is illustrated. In some embodiments of the method 100 described below, one or more system provider devices may operate to perform the method 100. For example, a distributed group of devices may operate to create (a.k.a. "mine") the distributed blockchain, monitor transactions performed using the blockchain, monitor a personal blockchain that include records of an individual(s) that includes credit information, identity information, medical information, education information, and/or any other personal information, monitor shipments, and other blockchain use scenarios known in the art may be performed during the creation of the distributed blockchain that acts as a ledger, and perform the method 100 as detailed below. In another embodiment, one or more system provider devices may perform the method 100 separate from the validation of blockchain. For example, a payment service provider such as, for example, PayPal, Inc. of San Jose, Calif., may utilize a payment service provider device to perform the method 100 discussed below, and in some embodiments may operate in cooperation with one or more other system providers (via their system provider devices) and/or payees (via their payee devices) to perform the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
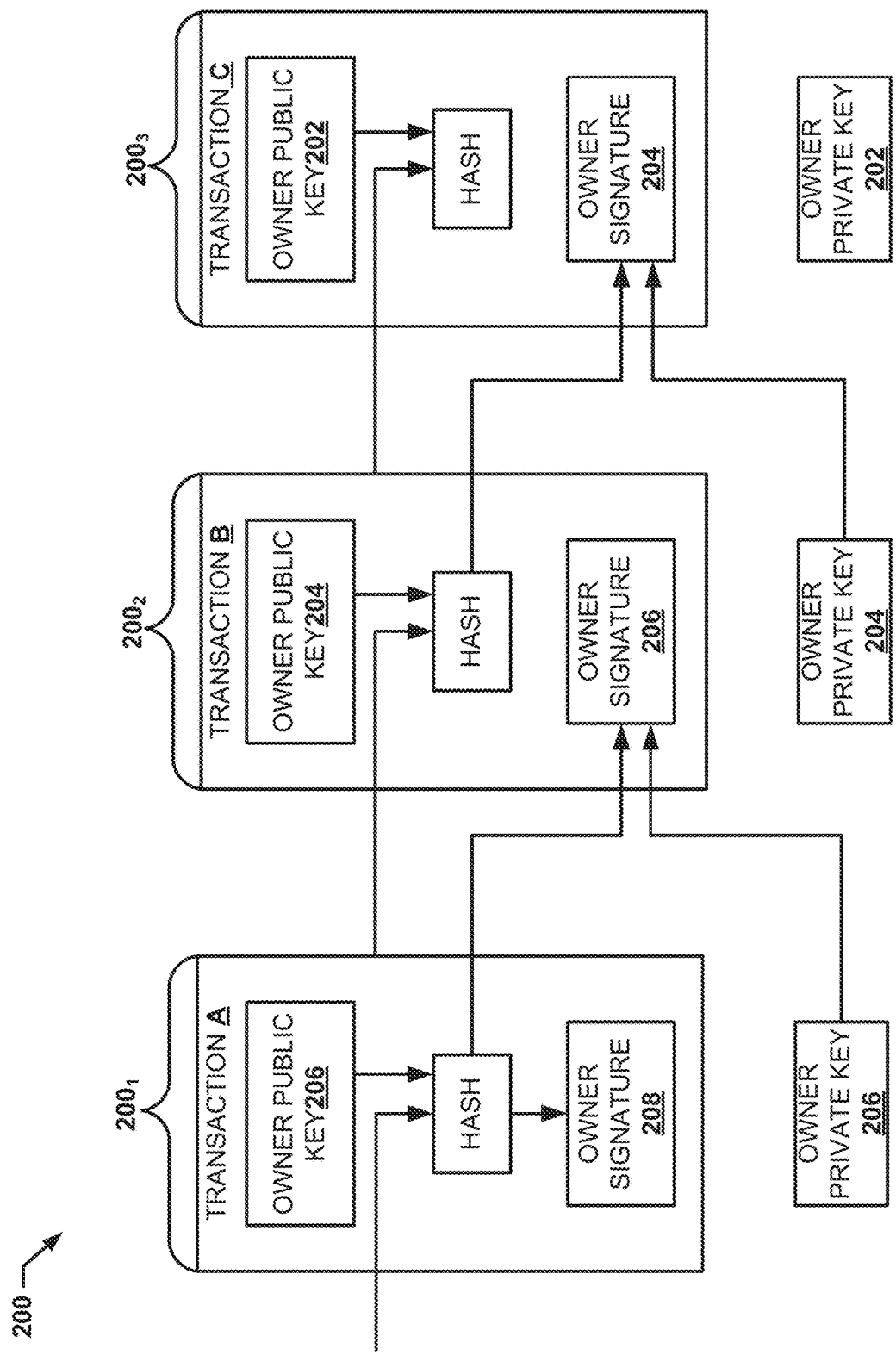
FIG. 2 is a schematic view illustrating an embodiment of an electronic coin.

Referring now to FIG. 2, an embodiment of an electronic coin 200 is illustrated and described briefly for reference in the discussion below. While the examples of blockchain are used herein to describe a use of blockchain with recording transactions involving an electronic coin of a virtual currency, one of skill in the art in possession of the present disclosure will recognize that blockchains may be used for recording many other events including records of an individual(s) that includes credit information, identity information, medical information, education information, and/or any other personal information, shipment information, and/or food traceability. In those embodiments where blockchain records transactions of a virtual currency, a virtual currency system associated with the present disclosure may define an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of previous owners 204, 206, and 208. Specifically, in transaction A, a hash value of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) using a private key and added to an initial electronic coin (which was defined by digital signatures provided up to the transaction prior to transaction A) such that the electronic coin $200_1$ was transferred to owner 206.

Similarly, in transaction B, a hash value of the public key of owner 204 (i.e., the owner receiving, as a result of transaction B, an electronic coin $200_2$ defined by digital signatures provided up to transaction B) and transaction A was signed by owner 206 using a private key and added to the electronic coin $200_1$ such that the electronic coin $200_2$ was transferred to owner 204. Similarly, in transaction C, a hash value of the public key of owner 202 (i.e., the owner receiving, as a result of transaction C, the electronic coin 200 defined by digital signatures provided up to transaction C) and the transaction B was signed by owner 204 using a private key and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coin(s)" may be used to encompass any amount or type of electronic coins or virtual/electronic currency.

Figure 3:
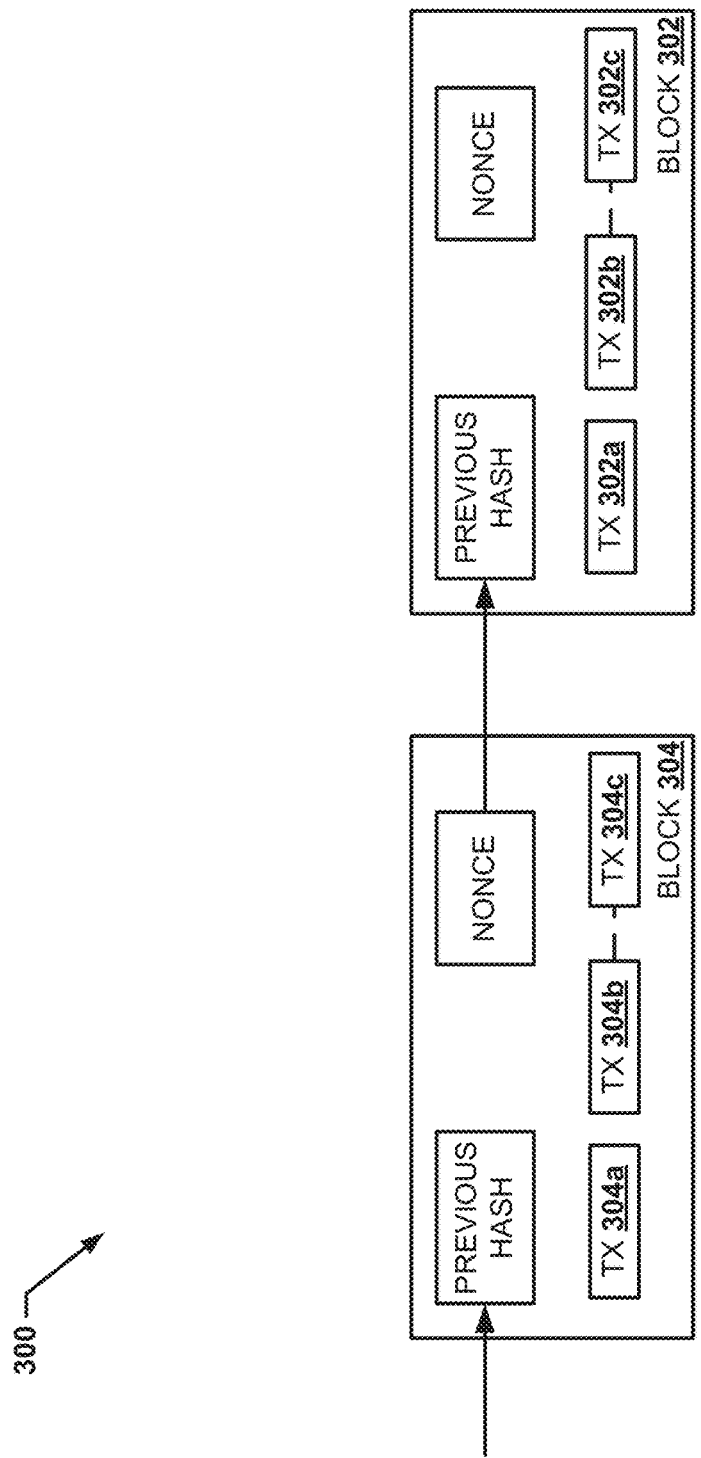
FIG. 3 is a schematic view illustrating an embodiment of a distributed ledger.

Referring now to FIG. 3, an embodiment of a distributed ledger 300 is illustrated and described briefly for reference in the discussion below. As discussed above, the distributed ledger 300 may operate to verify that payers transferring an electronic coin (e.g., referring back to FIG. 2, owner 206 in transaction A, owner 204 in transaction B, and owner 202 in transaction C) did not "double-spend" (e.g., use a private key to sign any previous transactions involving) that electronic coin. To produce the distributed ledger 300, a distributed network of devices operate to agree on a single history of transactions in the order in which they were received such that it may be determined that a transaction between a payer and a payee using an electronic coin is the first transaction associated with that electronic coin. Each device in the distributed network operates to collect new transactions into a block, and then to increment a proof-of-work system that includes determining a value that when hashed with the block provides a required number of zero bits.

For example, for a block 302 that includes a plurality of transactions 302a, 302b, and up to 302c, a device in the distributed network may increment a nonce in the block 302 until a value is found that gives a hash value of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash value of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device will switch to working on the branch of the chain that includes the second block).

The electronic coin(s) 200 and distributed ledger 300 discussed above may provide a distributed virtual currency system in which payers and payees may participate in transactions with each other without the need for a centralized authority such as a bank. Each of those transactions is recorded in the distributed ledger 300 to ensure that the electronic coins may only be spent by a payer once. However, it has been discovered that validation of those transactions via the hash value discussed above may be burdensome, and that such validation of those transactions may be expedited by providing an image associated the hash value.

Figure 4:
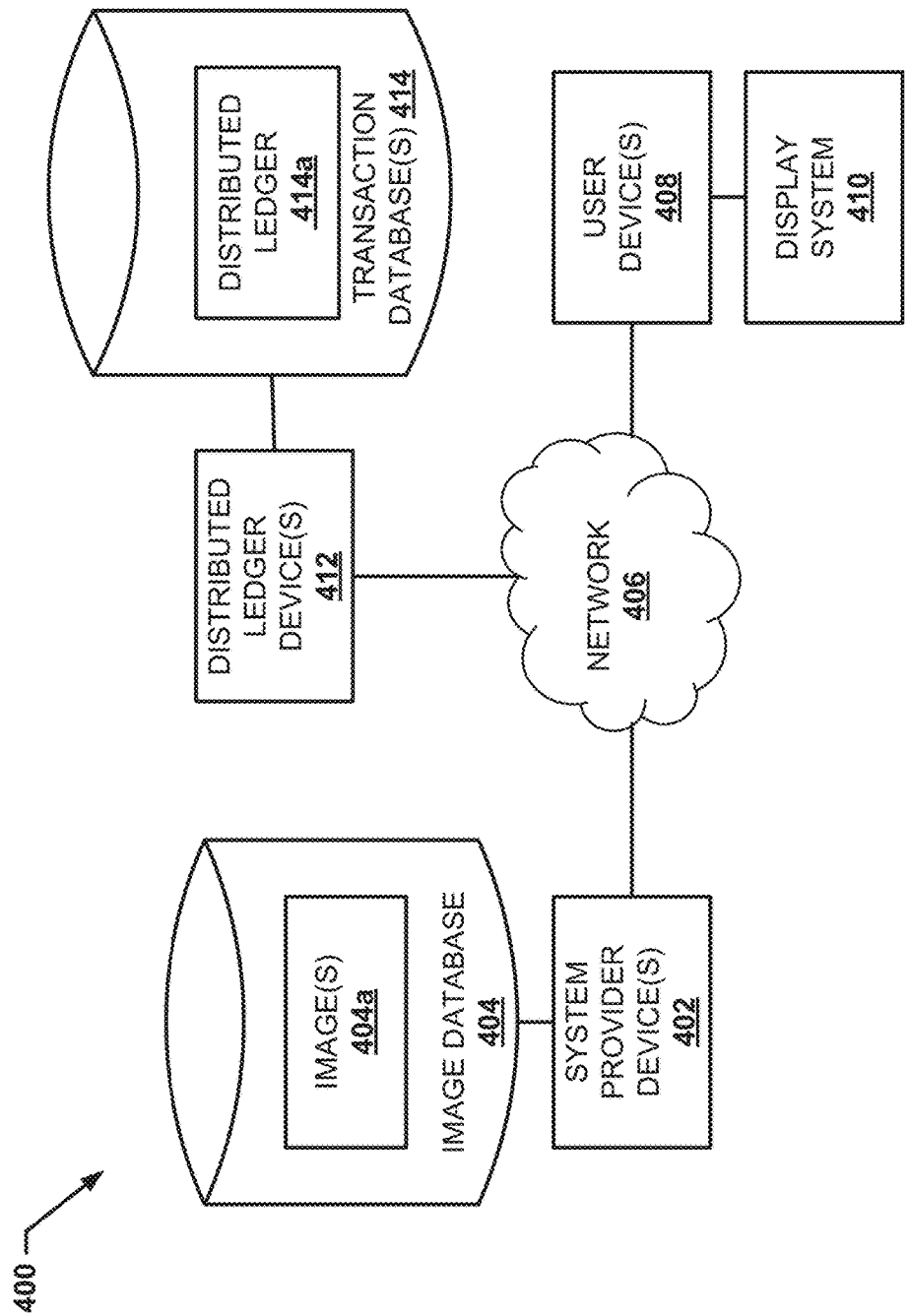
FIG. 4 is a schematic view illustrating an embodiment of a blockchain validation system.

Referring now to FIG. 4, an embodiment of a blockchain validation system 400 is illustrated and described briefly for reference in the method 100 discussed below. Some embodiments of the blockchain validation system 400 include one or more system provider device(s) 402 that are coupled to an image database 404 and a network 406. In those embodiments, the system provider device(s) 402 may provide an image 404a to be displayed on a display system of a user device when the users thereof are validating a blockchain. As such, in some embodiments, the system provider device (s) 402 may control the images 404a provided to the users.

However, as discussed below, the system provider device(s) 402 and image database 404 may be omitted in other embodiments (e.g., embodiments where users utilize user devices that provide the images and/or the image(s) are stored in the blockchain).

Other embodiments of the blockchain validation system 400 include a user device 408 that is coupled to a display system 410 and the network 406. In those embodiments, the first user device 408 may provide an image database of images used for validating a blockchain. However, in embodiments such as those discussed above in which a system provider device 402 controls the images 404a, user devices need not include the image database, and rather may include blockchain validation software configured to communicate with the system provider device(s) 402 to enable the functionality discussed below. Furthermore, in some embodiments, the system provider device(s) 402 and the user device 408, may be utilized during the method 100 to, for example, perform blockchain generation and validation functionality known in the art.

In the illustrated embodiment, the blockchain validation system 400 may also include distributed ledger device(s) 412 that are coupled to a transactional database 414 and the network 406. As discussed above, the distributed ledger device(s) 412 may operate to receive virtual currency transactions broadcast by the system provider device(s) 402 and the user device 408, confirm those transactions, and generate a distributed ledger 420 (i.e., a distributed blockchain) discussed above with reference to FIG. 3.

Figure 5:
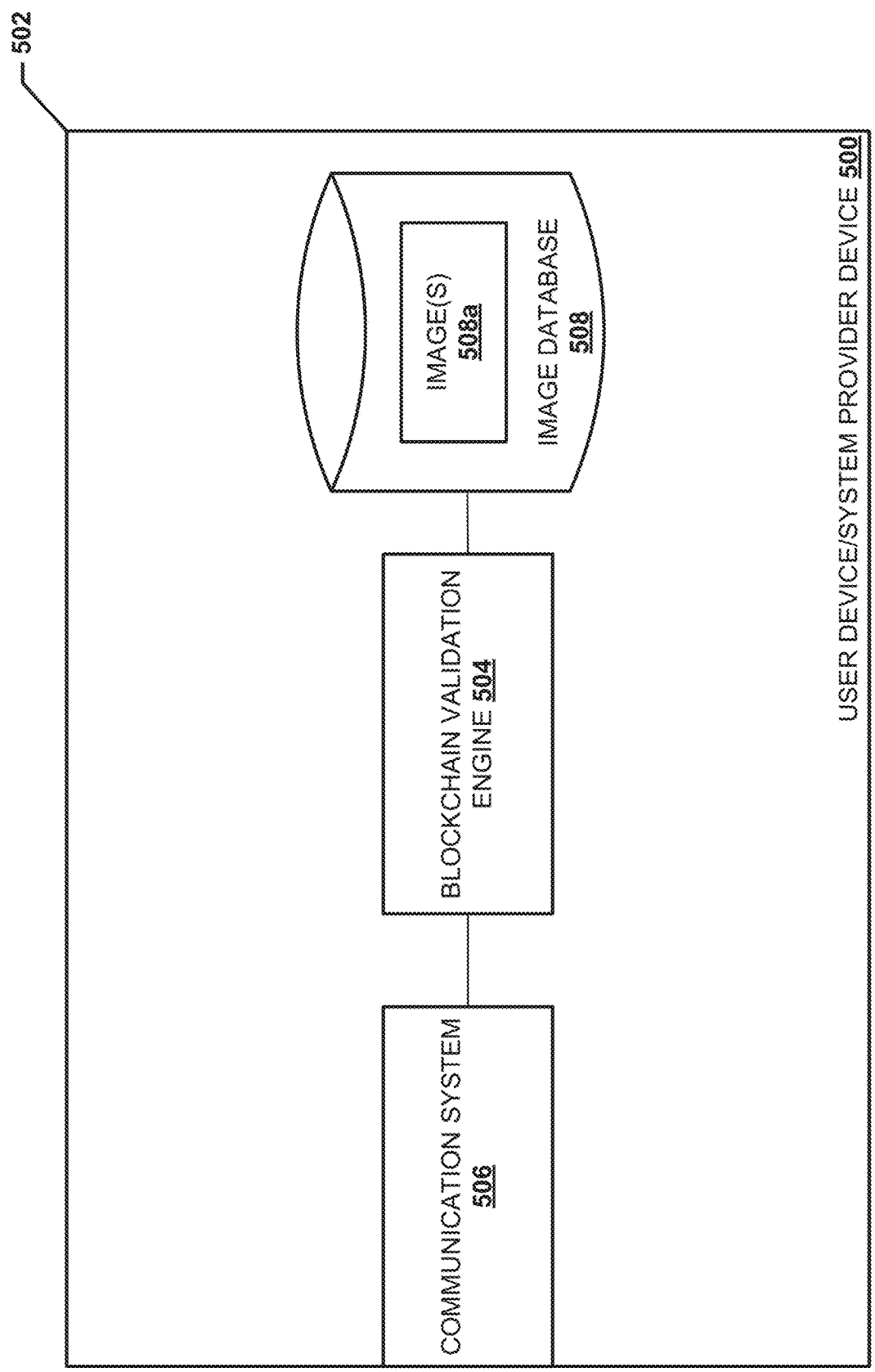
FIG. 5 is a schematic view illustrating an embodiment of a user device or system provider device used in the blockchain validation system of FIG. 4.

Referring now to FIG. 5, an embodiment of a device 500 is illustrated that in some embodiments may be the system provider device(s) 402 discussed above, and in other embodiments may be the user device 408 discussed above. As such, in some examples (e.g., those where the device 500 is provided for the system provider device(s) 402), the device 500 may be provided by one or more server devices, while in other examples (e.g., those where the device 500 is provided for the user device 408) the device 500 may be provided by a desktop computing system, a laptop/notebook computing system, a tablet computing system, a mobile phone, and/or other user devices known in the art. However, one of skill in the art in possession of the present disclosure will recognize that the device 500 may be provided by any of a variety of computing device in the different examples discussed below.

In the illustrated embodiment, the device 500 includes a chassis 502 that houses the components of the device 500, only some of which are illustrated in FIG. 5. For example, the chassis 502 may house a processing system (not illustrated) and a non-transitory memory system (not illustrated) that includes instructions that, when executed by the processing system, cause the processing system to provide a blockchain validation engine 504 that is configured to perform the functions of the blockchain validation engines and devices discussed below according to the method 100. The chassis 502 may also house a communication system 506 that is coupled to the blockchain validation engine 504 (e.g., via a coupling between the communication system 506 and the processing system) and configured to provide for communication through the network 406 as detailed below. In the illustrated embodiment, device 500 also includes a storage device with an image database 508 having image(s) 508a, discussed in further detail below. While the device is illustrated as including a chassis 502 that houses the image database 508, one of skill in the art in possession of the present disclosure will recognize that the image database 508 may be provided in a different device/chassis than the device 500 such as, for example, a network attached storage device, a non-network attached computing device (e.g., a "cold storage" device), and/or any other device or storage system known in the art.

In some embodiments, the system provider device(s) 402 may provide a blockchain validation application through the network to the user device 408 prior to or during the method 100, and that blockchain validation application may provide the blockchain validation engine 504 in the user device 408. However, in other embodiments, the blockchain validation application may be provided on the user device 408 by a user separately from the method 100.

Figure 6:
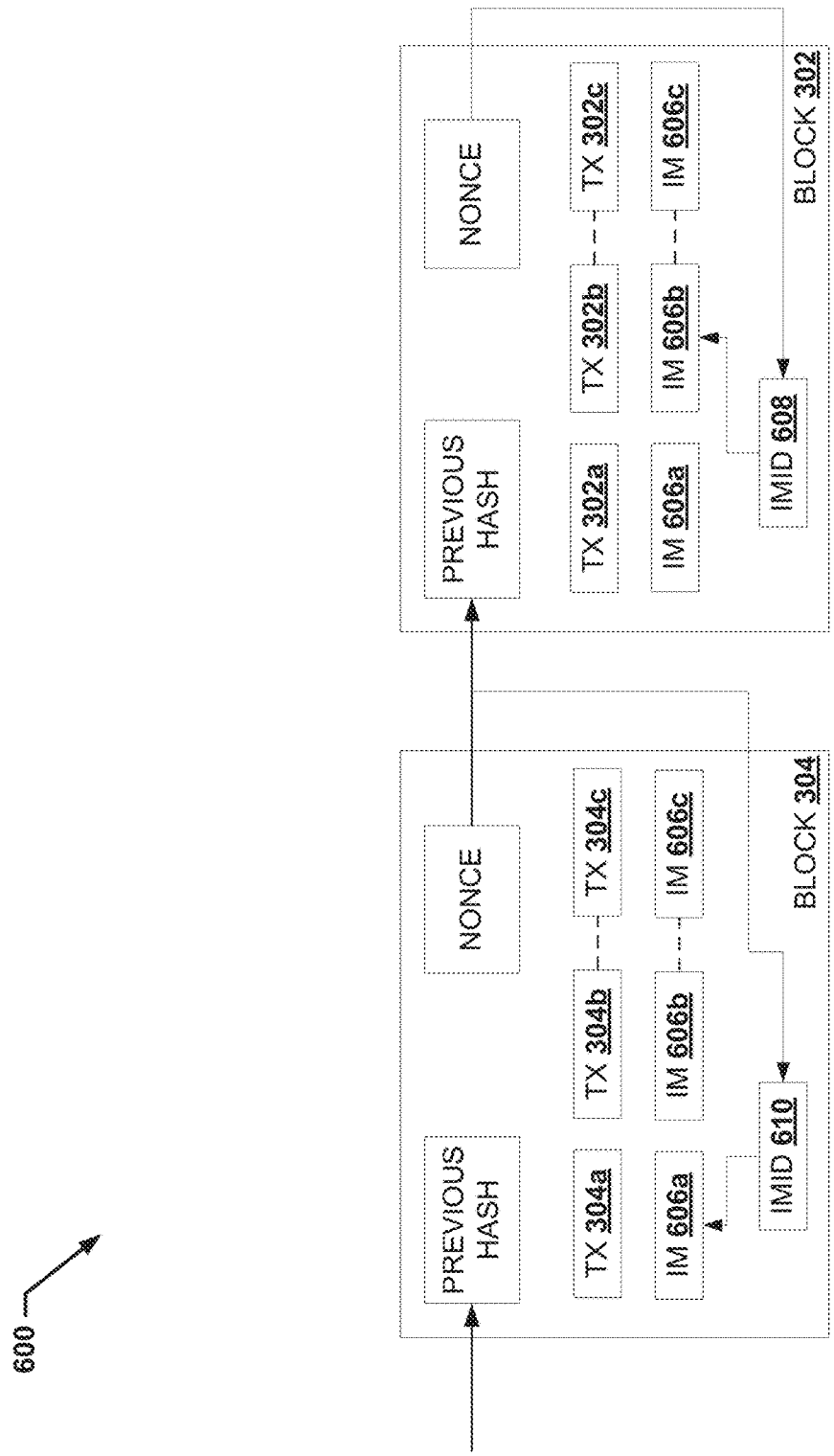
FIG. 6 is a schematic view illustrating an embodiment of a distributed ledger with images for blockchain validation.

Referring back to FIG. 1, the method 100 begins at block 102 where a hashing algorithm is applied to a first block of a blockchain to generate a first hash value. For example, the first block of the blockchain may have been created similarly to the block 304 and/or the block 302 as discussed above with reference to FIG. 3. The blockchain validation engine 504 may include a hashing algorithm (e.g., secure hash algorithm 1 (SHA-1), SHA-2 that includes SHA-256, SHA-3, RIPEMD, and/or other hashing algorithms apparent to one of skill in the art in possession of the present disclosure). The hashing algorithm may hash the first block to generate the first hash value. Referring to FIG. 6, a specific example of a distributed ledger 600 is illustrated that may include the distributed ledger 300 described above with reference to FIG. 3. As illustrated in FIG. 6, a hashing algorithm may be applied to block 302 to generate a hash value based on the data included in the block 302 (e.g., the transactions 302a-302c), the nonce, and the previous hash value of block 304.

The method 100 then proceeds to block 104 where the first hash value is associated with a first image. In an embodiment at block 104, the blockchain validation engine 504 may associate the first hash value with a first image. As discussed above, the blockchain validation engine may be coupled to an image database 508 that includes one or more images 508a. The blockchain validation engine 504 may associate the first hash value to one of the images 508a stored in the image database 508. For example, the blockchain validation engine 504 may convert the first hash value to an image identifier that identifies one of the images in the image database 508. In another example, the blockchain validation engine 504 may randomly assign an image to the first hash value while in other examples, the blockchain validation engine 504 may receive a user input that indicates an image that is to be assigned to the first hash value.

While the images 508a are described as being stored in the image database 508, as illustrated in FIG. 6, the images may be stored in each block of the distributed ledger 600. Storing the images within the blockchain provides advantages that the images are self-contained within the blockchain and do not require any external dependencies. As the blockchain changes the image shown will change with the blockchain and become part of the immutability of the blockchain with the "genesis block." For example, the block 304 may store the images 606a, 606b, and up to 606c and block 302 may store the images 606a, 606b, and up to 606c when created. The hash value of the block 304 may be associated with the image 606a while the hash value of the block 302 may be associated with the image 606b. As illustrated in FIG. 6, an association of the hash value and the image may be stored in each block of the blockchain. For example, an image identifier 608 may be stored in the block 302, which associates the hash value of the block 302 with the image 606b. Similarly, an image identifier 610 may be stored in the block 304, which associates the hash value of the block 304 with the image 606a.

Because of the distributed nature of the blockchain, storing each image 606a-606c in each block 302 and 304 may unnecessarily increase the size of the blockchain, which in turn increases the time to confirm the blockchain. Therefore, while the example in FIG. 6 illustrates that each block of the distributed ledger 600 includes the images 606a, 606b, and up to 606c, the images 606a-606c may be stored in a single block (e.g., in the block 304) or distributed among the blocks in the distributed ledger 600 (e.g., images 606a and 606b may be stored in the block 304 while the image 606c is stored in the block 302).

In various embodiments, to reduce the size of the distributed ledger 600 when the distributed ledger 600 stores the images used for the systems and methods for validating blockchain described herein, the plurality of images 606a-606c are one or more plenoptic images. Plenoptic images may be created by plenoptic (e.g., light-field) cameras or other imaging devices. In one embodiment, plenoptic cameras use microlens arrays (also known as lenticular lens arrays) that are placed at the focal plane of the cameras main lens, along with an image sensor positioned behind the microlens array. Plenoptic cameras produce an image that allows the displacement of image parts that are not in focus to be analyzed such that depth information can be extracted, which enable the 'virtual' refocusing of the image using a computer (e.g., a processor.) One of skill in the art will recognize that the system and method described to produce a plenoptic image above has been presented as merely of one example of how to do so, and the system and method used to produce the plenoptic image used in the method 100 is not included to limit the scope of the present disclosure.

Thus, when a plenoptic image is provided for display on the display system 410, as discussed below, at least one of the plurality of image objects is in focus and at least one of the plurality of image objects is not in focus. As such, in an example, a first object of the plurality of objects in the plenoptic image may be displayed as being in focus while the remaining objects of the plurality of objects not be in focus. In a subsequent display of the plenoptic image, a second object in the plenoptic image may be selected to be in focus while the remaining objects of the plurality of objects, including the first object, may not be in focus. Thus, the same plenoptic image may be displayed in a plurality of different ways such that a plurality of hash values may associated with same image. In various embodiments at block 104, the hash value of the block 302 may be converted by the blockchain validation engine 504 to a focal point value of the plenoptic image that indicates which object(s) in the plenoptic image are in focus. The focal point value may be stored in the block 302 as the association between the hash value and the object of the plenoptic image. One skilled in the art will recognize that when referring to a first image and a second image herein, the first image may be a first object or a first group of objects of a plurality of objects included in a plenoptic image that is/are in focus, and the second image may be a second object or a second group of objects of the plurality of objects of the plenoptic image that is/are in focus, respectively. In one embodiment, out of focus is defined relative to in focus. For example, an out of focus image can be defined as an image blurred to the extent that a person (e.g., by someone with 20/20 vision or by the specific vision level of the person viewing the images) viewing the image is able to distinguish a difference between the blurred (out of focus) image where the edges of the image are perceived as unclear and an in focus image that is sharp where the edges of the image are perceived as being sharp and distinct. In this example, the "in focus" image may not be 100% sharp or distinct, but just less out of focus than the "out of focus" image.

The method 100 then proceeds to block 106, where the first image is provided on the display device based on the first hash value. In an embodiment at block 106, the blockchain validation engine 504 may provide the image for display on the display system 410 that is coupled to the user device 408 when that image is associated with the hash value of the block of the blockchain. For example, the blockchain validation engine 504 may retrieve the first image, based on the association, from the image database 404/508 and provide the image to the display system 410. Similarly, as illustrated in FIG. 6, the blockchain validation engine 504 may retrieve the image 606b from block 302 based on the image identifier 608 that associates the hash value with the image 606b and provide image 606b on the display system 410.

Figure 7:
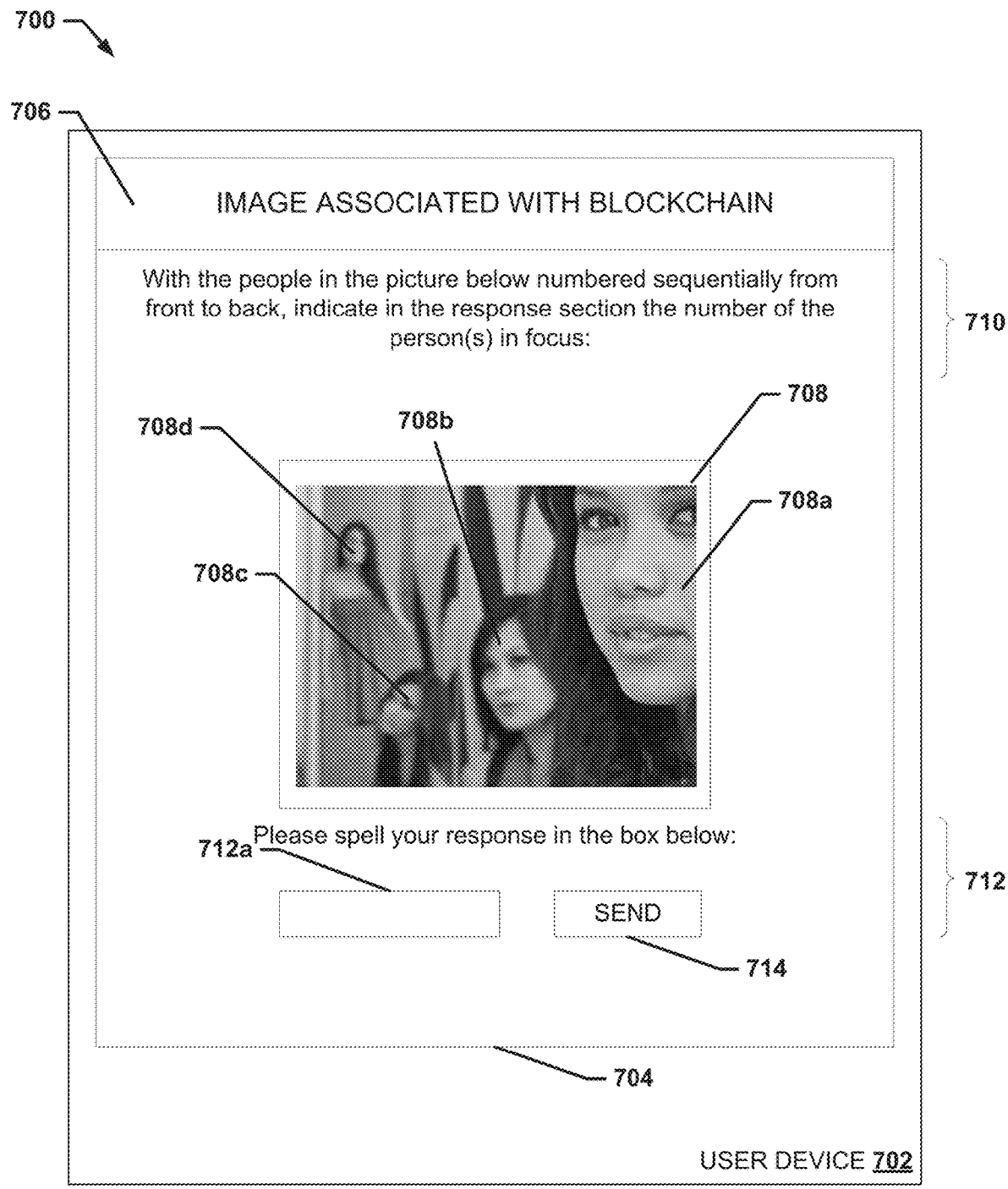
FIG. 7 is a front view illustrating an embodiment of a user device being used to validate a blockchain.

Referring to FIG. 7, an embodiment of the blockchain validation system 700 is illustrated. The blockchain validation system 700 includes a user device 702, which may be the user device 408 of FIG. 4 and/or the user device 500 of FIG. 5, having a user device display 704. At block 106 of the method 100, an initial view 706 is provided to the user device 702 that includes an image 708 that is a plenoptic image in this example. The initial view 706 allows the user of the user device 702 to see what image is associated with the hash value of the most recent block of the blockchain (e.g., the block 302 of the distributed ledger 600) such that when the user proceeds to validate the blockchain at a later time, the user knows which image to expect.

The initial view also includes an instruction section 710, a response section 712, and a send button 714. In the embodiment illustrated in FIG. 7, the instruction section 710 includes the following instruction "With the people in the picture below numbered sequentially from front to back, indicate in the response section the number of the person(s) in focus:", and the response section includes instructions to spell a response in a response box 712a. The blockchain validation engine 504 may store the response in the blockchain or the image database 404/508 such that when the user subsequently validates the blockchain at a later time, the description of the image may be provided on the user device display 704. However, the details of the instruction section 710 and/or the response section 712 in the initial view 706 of FIG. 7 are meant to be merely as examples, and one of skill in the art will recognize that a variety of instruction sections and response sections that detail to the user what information about the image 708 should be provided in the response box 712a will fall within the scope of the present disclosure. Furthermore, the image 708 may already have a plurality of descriptions associated with each image such that those descriptions based on the stored associations may be reproduced when the blockchain is being validated at a subsequent time to remind the user, which image the user should be seeing without the user providing an input of what the user is seeing at the initial view 706.

In one embodiment, the image 708 in the initial view 706 may be provided to the user device 702 such that one of a plurality of image objects in the image 708 is displayed on the user device display 704 in focus. For example, the image 708 may include a first image object 708a (e.g., the person's face in the front and the far right of the image 708), a second image object 708b (e.g., the person second from the front and third from the left of the image 708), a third image object 708c (e.g., the person third from the front and second from the left of the image 708), and a fourth image object 708d (e.g., the person in the back and at the far left of the image 708). Thus, a user may be presented (through the user device display 704 on the user device 702) with the image 708 having the first image object 708a in focus, the image 708 having the second image object 708b in focus, the image 708 having the third image object 708c in focus, the image 708 having the fourth image object 708d in focus, or any combination of the image objects 708a-708d in focus. As illustrated in FIG. 7, the first hash value may cause the first image object 708a to be displayed on the user device display 704 in focus.

The method 100 then proceeds to block 108 where a first blockchain validation request is received. In an embodiment at block 108, the user may request a validation of the blockchain after the user has initially viewed the image that is associated with the hash value of the current block (e.g., the block 302) of the blockchain. The user may request a validation of the blockchain to check whether any unauthorized changes have been made to blockchain. The blockchain validation engine 504 may receive the first blockchain validation request via user inputs on the user device 408/500.

The method 100 then proceeds to block 110 where the hashing algorithm is applied to the first block of the blockchain to produce a second hash value. In an embodiment at block 110, the blockchain validation engine 504 may apply the hashing algorithm to the first block that was applied to the first block in block 104 to return a second hash value. If the data in blockchain has not changed subsequent to when the block was confirmed, which resulted in the first hash value, then the second hash value should be the same as the first hash value. However, if the data stored within the blockchain has changed, then the second hash value will be different than the first hash value, which may indicate to the user that an unauthorized change to the blockchain has occurred. As discussed above, visually comparing hash values and remembering the first hash value is difficult for some users when validating the blockchain.

In the specific example of FIG. 6, if the transactions 302a-302c and/or 304a-304c of the distributed ledger 600 remain the same as when the first hash value was generated and the block 302 is hashed according to the hashing algorithm described above, then the second hash value that is generated in response to the first validation request is the same as the first hash value. However, if any change was made to the transactions 302a-302c and/or 304a-304c, the second hash value will be different than the first hash value.

The method 100 then proceeds to block 112 where a second image from the plurality of images is provided. Similarly, as described above, the blockchain validation engine 504 may associate the second hash value with a second image. For example, the blockchain validation engine 504 may convert the second hash value to an image identifier that identifies one of the images in the image database 508 to display as the second image on the display system 410. If the second hash value is the same as the first hash value, then the same image identifier is generated by the blockchain validation engine 504. In another example, the blockchain validation engine 504 may compare the second hash value to the first hash value in the stored association of the first hash value and the first image to determine whether the first hash value matches the second hash value. If the first and second hash values match, then the first image is displayed as the second image. If the first hash value and the second hash value do not match, then an alternative image may be displayed on the display system 410 that is different than the first image. For example, the blockchain validation engine 504 may randomly provide an alternative image when the second hash value is different than the first hash value while in other examples, the blockchain validation engine 504 may provide a user provided alternative image as the second image that is to be displayed on the display system 410 when the second hash value is different than the first hash value.

Figure 8A:
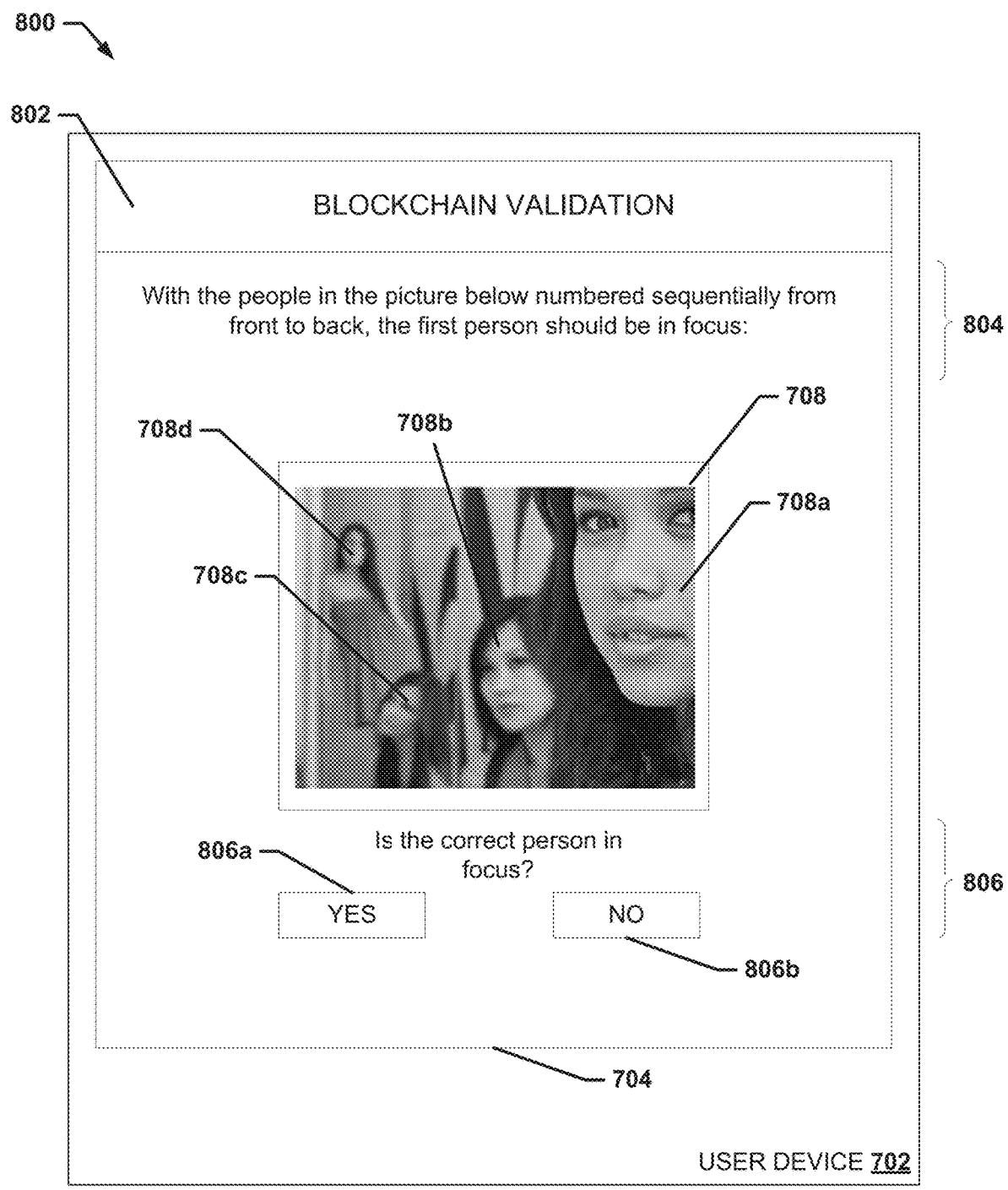
FIG. 8A is a front view illustrating an embodiment of a user device being used to validate a blockchain.
Figure 8B:
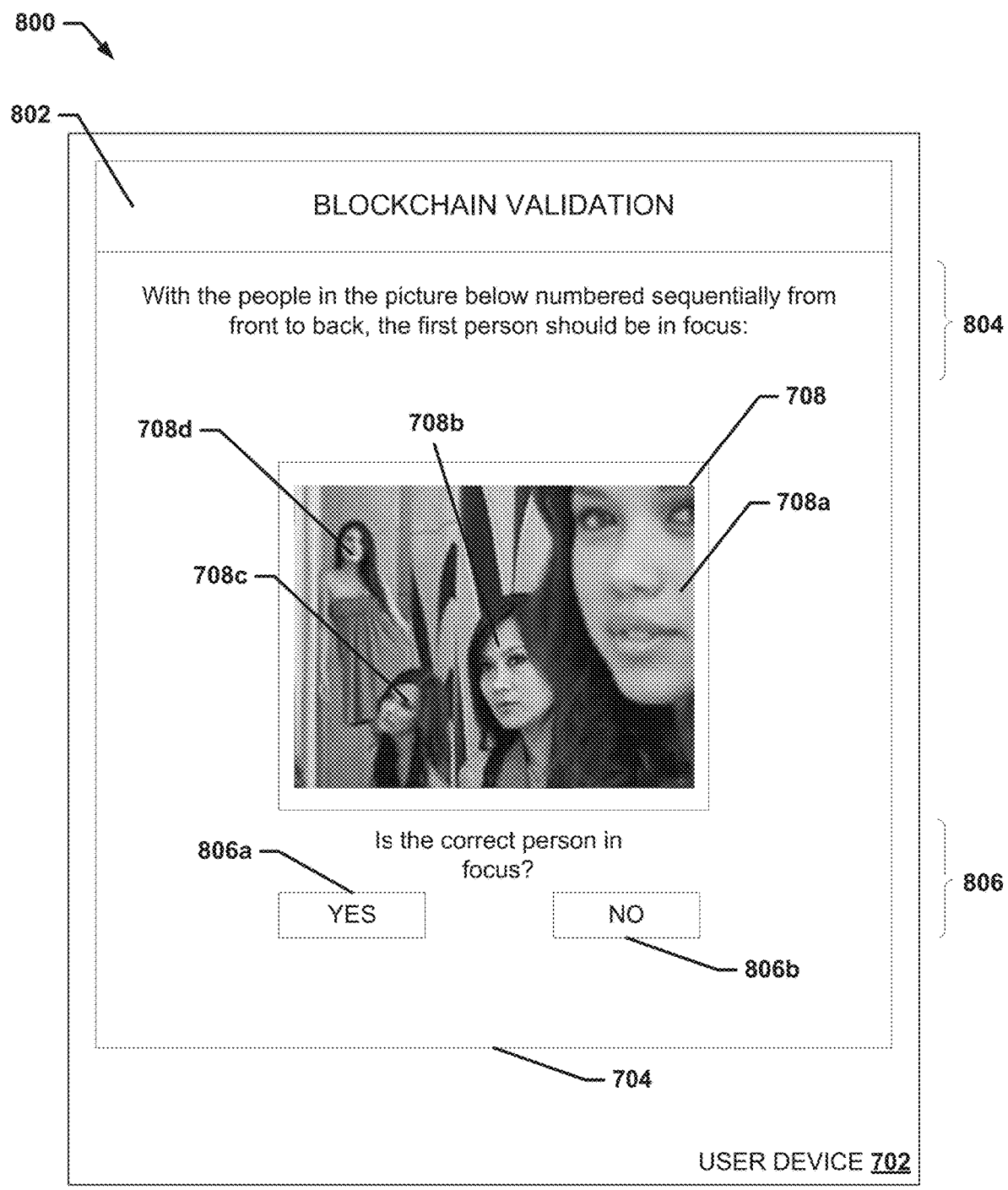
FIG. 8B is a front view illustrating an embodiment of a user device being used to validate a blockchain.

Referring to FIGS. 8A and 8B, an embodiment of the blockchain validation system 800 is illustrated. The blockchain validation system 800 includes the user device 702 of FIG. 7 having the user device display 704. At block 112 of the method 100, a blockchain validation view 802 is provided to the user device 702 that includes the image 708. The blockchain validation view 802 provides the second image that is determined based on the second hash value that is generated at block 110.

The blockchain validation view 802 also includes an instruction section 804 and a response section 806. In the embodiment illustrated in FIG. 8, the instruction section 804 includes the following instruction "With the people in the picture below numbered sequentially from front to back, the first person should be in focus:", and the response section includes instructions to select a "YES" button 806a or a "NO" button 806b. The blockchain validation engine 504 may retrieve the response of the description of the person in focus that was entered in the response section 712 of FIG. 7 from the blockchain or the image database 404/508 such that the description of the image may be provided on the user device display 704 in the instruction section 804. However, the details of the instruction section 804 and/or the response section 806 in the blockchain validation view 802 of FIGS. 8A and 8B are meant to be merely as examples, and one of skill in the art will recognize that a variety of instruction sections and response sections that detail to the user what information about the image 708 should be provided will fall within the scope of the present disclosure including no instructions at all.

In one embodiment, the image 708 in the blockchain validation view 802 may be provided to the user device 702 such that one of a plurality of image objects in the image 708 is displayed on the user device display 704 in focus. The image object in the image 708 that is displayed on the user device display 704 in focus may depend on the hash value of the block of the blockchain (e.g., the block 302 of the distributed ledger 600). For example, the image 708 may include the first image object 708a (e.g., the person's face in the front and the far right of the image 708), the second image object 708b (e.g., the person second from the front and third from the left of the image 708), the third image object 708c (e.g., the person third from the front and second from the left of the image 708), and the fourth image object 708d (e.g., the person in the back and at the far left of the image 708). Thus, a user may be presented (through the user device display 704 on the user device 702) with the image 708 having the first image object 208a in focus, the image 708 having the second image object 708b in focus, the image 708 having the third image object 708c in focus, or the image 708 having the fourth image object 708d in focus. If the second hash value is the same as the first hash value, then the first image object 708a is displayed on the user device display 704 in focus as illustrated in FIG. 8A. The blockchain validation engine 504 may convert the second hash value to a focal point for the first image object 708a and because the second hash value is the same as the first hash value, then that focal point for the second hash value is the same as the focal point for the first hash value. However, if the second hash value is different than the first hash value, then the first image object 708*a* is displayed on the user device display 704 as not in focus as illustrated in FIG. 8B. The blockchain validation engine 504 may convert the second hash value to a focal point for the second image object 708*b*, and thus the second image object 708*b* is displayed on the user device display 704 in focus as illustrated in FIG. 8B.

The method 100 then proceeds to block 114 where a determination is made as to whether the second image is substantially similar to the first image. In an embodiment at block 114, the blockchain validation engine 504 may determine whether the second image is the same as the first image or within a predetermined threshold of similarity (e.g., 80% similar, 90% similar, 95% similar, 99% similar or other thresholds). For example, the blockchain validation engine 504 may include an image comparison algorithm that compares the generated second image to the first image, which may have been stored by the user device 408 during the initial view, to determine whether there are any differences between the two images. The image comparison algorithm may use image differencing techniques (e.g., the Hutchinson metric) that determine changes between images by finding the difference between each pixel in each image, which requires alignment of the two images and calibration of their photometric values. In another example, the user of the user device 702 may determine whether the image 708 that the user is visually seeing on the user device display 704 in FIG. 8A or FIG. 8B is the same as what is being described in the instruction section 804 and/or from the user's memory of what image was displayed on the user device display 704 in FIG. 7.

If at block 114 the second image is determined to be substantially similar to the first image, the method proceeds to block 116 where a validation notification is received. In an embodiment, the blockchain validation engine 504 may determine that the second image is substantially similar to the first image and generate a validation notification. The blockchain validation engine 504 may provide the validation notification over the network 406 and/or end the method 100. In another example, the user of the user device 702 may determine that the image 708 in FIG. 8A displays the image 708 with the first image object 708*a* in focus during the blockchain validation view 802 that was displayed in the initial view 706 of FIG. 7. The user may select the "YES" button 806*a* such that the blockchain validation engine 504 receives the user input as a validation notification.

If at block 114 the second image is determined to not be substantially similar to the first image, the method proceeds to block 118 where an invalidation notification is received. In an embodiment, the blockchain validation engine 504 may determine that the second image is not substantially similar to the first image. The blockchain validation engine 504 may provide the invalidation notification over the network 406 to the distributed ledger device(s) 412, the system provider device(s) 402, and/or the user device(s) 408 depending on which device is hosting the blockchain validation engine 504. In another example, the user of the user device 702 may determine that the image 708 in FIG. 8B displays the image 708 with the second image object 708*b* in focus during the blockchain validation view 802, which is different than the first image object 708*a* that was displayed in the initial view 706 of FIG. 7. The user may select the "NO" button 806*b* such that the blockchain validation engine 504 receives the validation notification. In response, the blockchain and/or the block may be flagged as invalid and blockchain validation engine 402 may initiate a process to determine where the deviation in the blockchain is located.

Thus, a system and method have been described that provide for blockchain validation by providing images on a display system that are associated with a hash value of a current block of a blockchain. Any changes to the blockchain will result in a changed hash value. As a result of the changed hash value, the image displayed on the display system will be different or not the image that was initially displayed on the display system to the user when the block was first confirmed. Thus, a user of the blockchain validation system may easily confirm the integrity of the blockchain by determining whether the displayed image is the expected image. As such, the user does not have to memorize and compare hash values, which may be difficult for some users of the blockchain. In some embodiments, one or more plenoptic images may be used in the systems and methods described, which may decrease processing time and the amount of storage required when storing images in the blockchain itself because each of a plurality of hash values may be associated with a respective focal point within the plenoptic image. When that focal point of the plenoptic image is selected, an image object associated with that focal point provided on a display device in focus. Thus, the same plenoptic image may be displayed in a plurality of different ways, which eliminates the need for a distinct image file for each hash value.

Referring now to FIG. 9, an embodiment of a networked system 900 used in the blockchain validation system 400 described above is illustrated. The networked system 900 includes a plurality of user devices 902, a plurality of distributed ledger devices 904, and a plurality of system provider devices 906 in communication over a network 908. Any of the user devices 902 may be the user devices operated by the users, discussed above. Any of the distributed ledger devices 904 may be the distributed ledger devices discussed above. Any of the system provider devices 906 may be the system provider devices operated by the system providers, discussed above.

The user devices 902, distributed ledger devices 904, and/or system provider devices 906 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 908.

The network 908 may be implemented as a single network or a combination of multiple networks. For example, in various embodiments, the network 908 may include the Internet and/or one or more intranets, landline networks, wireless networks, and/or other appropriate types of networks.

The user devices 902 may be implemented using any appropriate combination of hardware and/or software configured for wired and/or wireless communication over network 908. For example, in one embodiment, the user devices 902 may be implemented as a personal computer of a user in communication with the Internet. In other embodiments, the user devices 902 may be a smart phone, wearable computing device, laptop computer, and/or other types of computing devices.

The user devices 902 may include one or more browser applications which may be used, for example, to provide a convenient interface to permit the user to browse information available over the network 908. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 902. In particular, the other applications may include a payment application for payments assisted by a payment service provider. The other applications may also include security applications for implementing user-side security features, programmatic user applications for interfacing with appropriate application programming interfaces (APIs) over the network 908, or other types of applications. Email and/or text applications may also be included, which allow the user to send and receive emails and/or text messages through the network 908. The user devices 902 include one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used to associate the user with a particular account as further described herein.

Figure 10:
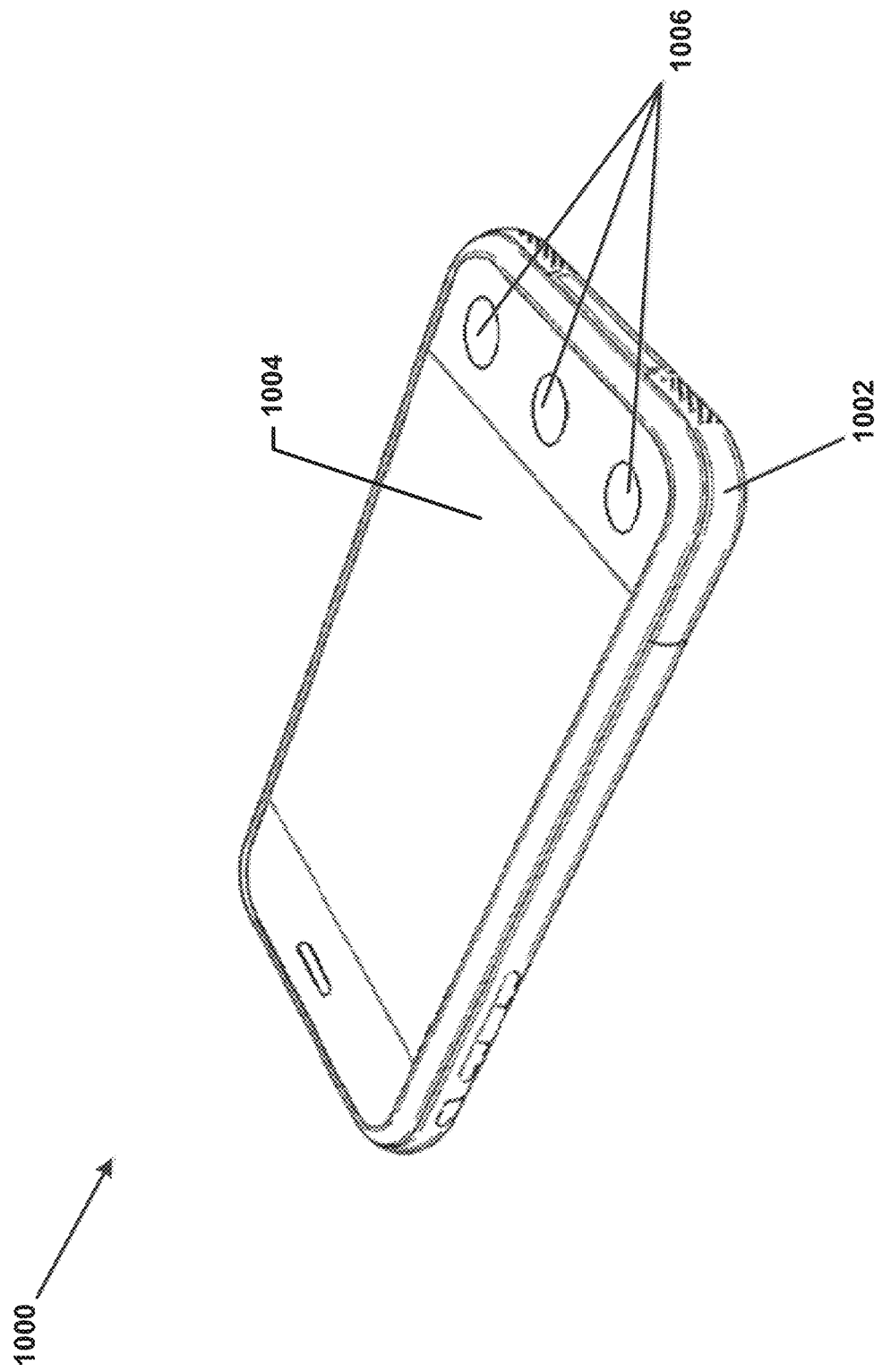
FIG. 10 is a perspective view illustrating an embodiment of a user device.

Referring now to FIG. 10, an embodiment of a user device 1000 is illustrated. The device 1000 may be any of the user devices discussed above. The device 1000 includes a chassis 1002 having a display 1004 and an input device including the display 1004 and a plurality of input buttons 1006. One of skill in the art will recognize that the device 1000 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 11:
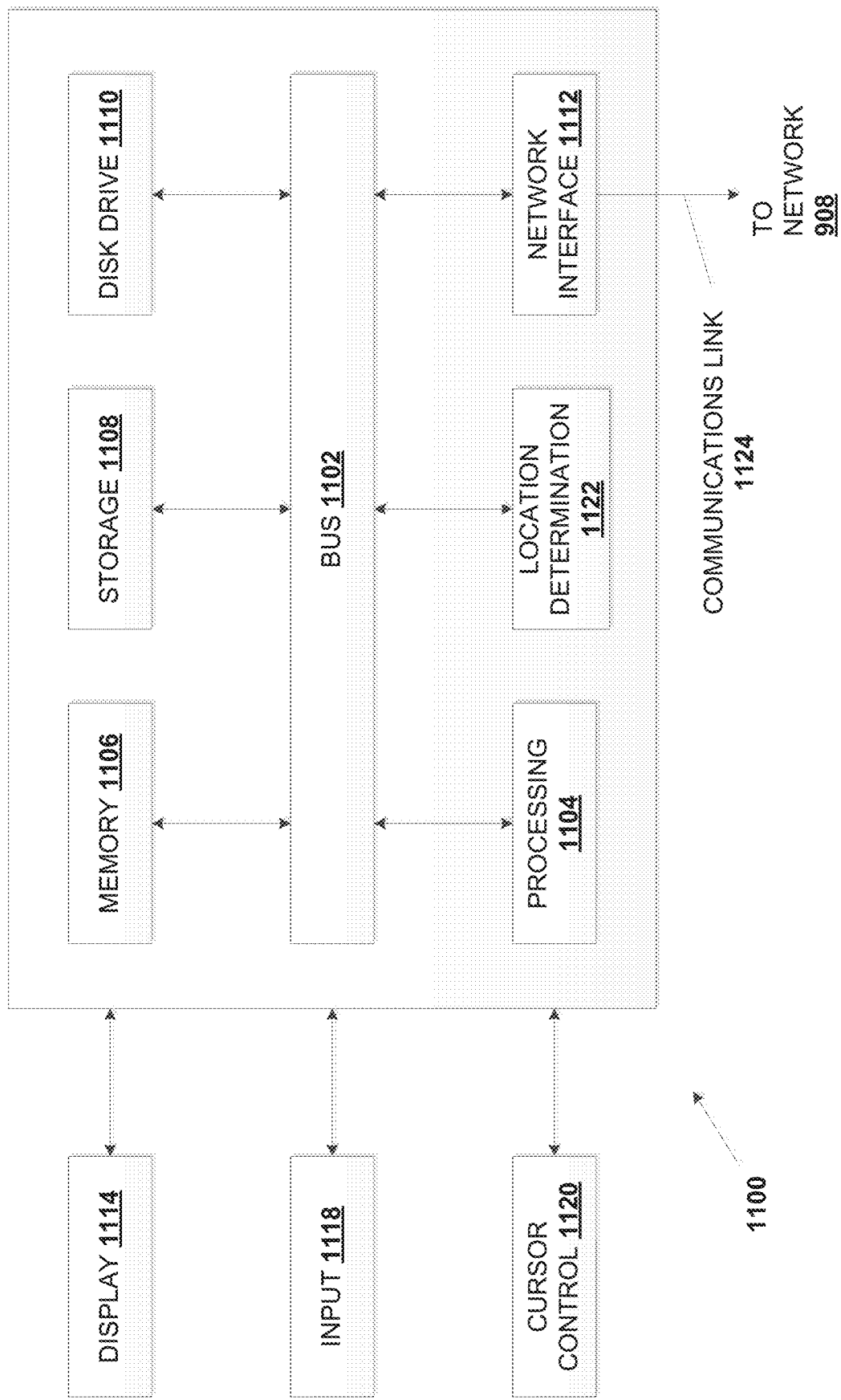
FIG. 11 is a schematic view illustrating an embodiment of a computer system.

Referring now to FIG. 11, an embodiment of a computer system 1100 suitable for implementing, for example, the user devices, distributed ledger devices, and/or system provider devices, is illustrated. It should be appreciated that other devices utilized in the distributed ledger authentication system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices known in the art). In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the payer devices, payee devices, user devices, payment service provider devices, and/or system provider devices. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 908 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A blockchain validation system, comprising:
a non-transitory memory; and
one or more hardware processors coupled to the non-transitory memory and configured to read instructions from the non-transitory memory to cause the system to perform operations comprising:
receiving a first validation request of a blockchain;
applying a hashing algorithm to a first block of the blockchain to produce a first hash value; and
in response to the first validation request of the blockchain, providing an image, from a plurality of images, on a display device, wherein a first image is selected as the image to be provided to the display device based on the first hash value, and wherein when a second image is displayed as the image on the display device and the first image is expected to be displayed on the display device in response to the first validation request, the displaying of the second image indicating to a user that a change has occurred to the blockchain resulting in the second image due to a change in the first hash value.

2. The system of claim 1, wherein the operations further comprise:
subsequent to providing the image, receiving a first user input indicating that the blockchain is valid.

3. The system of claim 1, wherein the operations further comprise:
prior to receiving the first validation request of the blockchain, applying the hashing algorithm to the first block of the blockchain to produce the first hash value;
associating the first hash value with the first image to provide a first association; and
storing in the blockchain the first association of the first hash value with the first image, wherein the first association is retrievable based on the first hash value being generated in response to the first validation request.

4. The system of claim 1, wherein the operations further comprise:
providing a description of what the first image should be on the display device in response to the first validation request.

5. The system of claim 1, wherein the operations further comprise:
receiving a second validation request of the blockchain;
applying the hashing algorithm to a second block in the blockchain to produce a second hash value;
in response to the second validation request of the blockchain, providing a third image from the plurality of images on the display device, wherein the third image is selected as the image to be provided to the display device based on the second hash value; and
receiving a second user input indicating that the blockchain is valid.

6. The system of claim 1, wherein the operations further comprise:
receiving a second validation request of the blockchain;
applying the hashing algorithm to the first block in the blockchain to produce a second hash value that is different than the first hash value;
in response to the second validation request of the blockchain, providing the second image from the plurality of images on the display device, wherein the second image is selected as the image to be provided to the display device based on the second hash value; and
receiving a second user input indicating that the blockchain is invalid.

7. The system of claim 6, wherein the first image is a first object of a plurality of objects included in a plenoptic image and the first object is in focus and remaining objects of the plurality of objects are out of focus when the plenoptic image is displayed on the display device in response to the first validation request, and wherein the second image is a second object of the plurality of objects included in the plenoptic image that is in focus and remaining objects of the plurality of objects included in the plenoptic image, including the first object, is out of focus when the plenoptic image is displayed on the display device in response to the second validation request.

8. The system of claim 7, wherein the operations further comprise:
generating a first focal point derived from the first hash value that indicates the first object of the plenoptic image is to be in focus when displayed on the display device; and
generating a second focal point derived from the second hash value that indicates the second object of the plenoptic image is to be in focus when displayed on the display device.

9. The system of claim 1, wherein the first image is stored in the blockchain.

10. A method for validating a blockchain, comprising:
receiving, by a system provider device, a first validation request of a blockchain;
applying, by the system provider device, a hashing algorithm to a first block of the blockchain to produce a first hash value; and
in response to the first validation request of the blockchain, providing, by the system provider device, an image, from a plurality of images, on a display device, wherein a first image is selected as the image to be provided to the display device based on the first hash value, and wherein when a second image is displayed as the image on the display device and the first image is expected to be displayed on the display device in response to the first validation request, the displaying of the second image indicating to a user that a change has occurred to the blockchain resulting in the second image due to a change in the first hash value.

11. The method of claim 10, further comprising:
subsequent to providing the image, receiving, by the system provider device, a first user input indicating that the blockchain is valid.

12. The method of claim 10, further comprising:
prior to receiving the first validation request of the blockchain, applying, by the system provider device, the hashing algorithm to the first block of the blockchain to produce the first hash value;
associating, by the system provider device, the first hash value with the first image to provide a first association; and
storing, by the system provider device, in the blockchain the first association of the first hash value with the first image, wherein the first association is retrievable based on the first hash value being generated in response to the first validation request.

13. The method of claim 10, further comprising:
providing, by the system provider device, a description of what the first image should be on the display device in response to the first validation request.

14. The method of claim 10, further comprising:
receiving, by the system provider device, a second validation request of the blockchain
applying, by the system provider device, the hashing algorithm to a second block in the blockchain to produce a second hash value;
in response to the second validation request of the blockchain, providing a third image from the plurality of images on the display device, wherein the third image is selected as the image to be provided to the display device based on the second hash value; and
receiving, by the system provider device, a second user input indicating that the blockchain is valid.

15. The method of claim 10, further comprising:
receiving, by the system provider device, a second validation request of the blockchain;
applying, by the system provider device, the hashing algorithm to the first block in the blockchain to produce a second hash value that is different than the first hash value;
in response to the second validation request of the blockchain, providing, by the system provider device, the second image from the plurality of images on the display device, wherein the second image is selected as the image to be provided to the display device based on the second hash value; and
receiving, by the system provider device, a second user input indicating that the blockchain is invalid.

16. A non-transitory machine-readable medium having stored thereon machine-readable instructions executable to cause a machine to perform operations comprising:
receiving a first validation request of a blockchain;
applying a hashing algorithm to a first block of the blockchain to produce a first hash value; and
in response to the first validation request of the blockchain, providing an image, from a plurality of images, on a display device, wherein a first image is selected as the image to be provided to the display device based on the first hash value, and wherein when a second image is displayed as the image on the display device and the first image is expected to be displayed on the display device in response to the first validation request, the displaying of the second image indicating to a user that a change has occurred to the blockchain resulting in the second image due to a change in the first hash value.

17. The non-transitory machine-readable medium of claim 16, wherein the operations further comprise:
subsequent to the providing the image from the plurality of images on the display device, receiving a first user input indicating that the blockchain is valid.

18. The non-transitory machine-readable medium of claim 16, wherein the operations further comprise:
prior to receiving the first validation request of the blockchain, applying the hashing algorithm to the first block of the blockchain to produce the first hash value;
associating the first hash value with the first image to provide a first association; and
storing in the blockchain the first association of the first hash value with the first image, wherein the first association is retrievable based on the first hash value being generated in response to the first validation request.

19. The non-transitory machine-readable medium of claim 16, wherein the operations further comprise:
providing a description of what the first image should be on the display device in response to the first validation request.

20. The non-transitory machine-readable medium of claim 16, wherein the operations further comprise:
receiving a second validation request of the blockchain
applying the hashing algorithm to a second block in the blockchain to produce a second hash value;
in response to the second validation request of the blockchain, providing a third image from the plurality of images on the display device, wherein the third image is selected as the image to be provided to the display device based on the second hash value; and
receiving a second user input indicating that the blockchain is valid.

* * * * *